United States Patent
Völkl

(10) Patent No.: US 6,672,202 B2
(45) Date of Patent: Jan. 6, 2004

(54) DEVICE FOR FLATTENING PIECES OF MEAT

(76) Inventor: Thomas Völkl, Am Wald 16. Bruckmühl, 83052 (DE)

( * ) Notice: Subject to any disclaimer, the term of this patent is extended or adjusted under 35 U.S.C. 154(b) by 0 days.

(21) Appl. No.: 10/240,858
(22) PCT Filed: Apr. 5, 2001
(86) PCT No.: PCT/EP01/03911
§ 371 (c)(1),
(2), (4) Date: Oct. 4, 2002
(87) PCT Pub. No.: WO01/76376
PCT Pub. Date: Oct. 18, 2001

(65) Prior Publication Data
US 2003/0121420 A1 Jul. 3, 2003

(30) Foreign Application Priority Data
Apr. 7, 2000 (DE) .......................... 100 17 348

(51) Int. Cl.⁷ .............................. A23L 1/00; A23P 1/00; A22C 7/00; A22C 9/00
(52) U.S. Cl. ........................... 99/349; 99/353; 100/154; 100/161; 452/141; 452/142
(58) Field of Search ............................ 99/349, 352–355, 99/450.1, 450.2, 450.6, 450.7, 485, 484; 100/152–154, 176, 161, 168, 910; 452/141, 142, 174; 426/518

(56) References Cited
U.S. PATENT DOCUMENTS 3,234,589 A 2/1966 Haynes
4,467,497 A 8/1984 Peterson et al.
5,037,350 A * 8/1991 Richardson et al. ........ 452/174
5,540,140 A * 7/1996 Rubio et al. .................. 99/353
5,727,451 A * 3/1998 DeMars ....................... 99/386
6,170,391 B1 * 1/2001 Pomara, Jr. ............... 99/450.6
6,244,169 B1 * 6/2001 Shimazu ................... 99/450.2
6,257,132 B1 * 7/2001 Bifulco ....................... 100/161

FOREIGN PATENT DOCUMENTS

| CH | 559 010 | 2/1975 |
|---|---|---|
| DE | 2 140 585 | 2/1973 |
| EP | 0 027 301 A | 4/1981 |
| EP | 0 039 755 A1 | 11/1981 |
| FR | 2 358 107 A | 2/1978 |
| FR | 2 491 729 A | 4/1982 |
| FR | 2 711 483 A | 5/1995 |
| FR | 2 276 157 A | 5/1996 |

* cited by examiner

Primary Examiner—Timothy F. Simone
(74) Attorney, Agent, or Firm—Nixon & Vanderhye

(57) ABSTRACT

The invention relates to an improved flattening device for flattening pieces of meat so that said pieces of meat have a larger surface and a reduced thickness. The inventive device comprises a conveyor device (15, 31) on which the pieces of meat to be flattened are supplied to the flattening zone. In the area of the flattening zone mallet rolls or flattening rolls (29) are provided that can be displaced relative to the piece of meat. The distance between the mallet rolls or flattening rolls (29) that can be moved across the piece of meat to be flattened and a counter pressure device or surface (33) can be preferably reduced while the piece of meat is flattened.

21 Claims, 2 Drawing Sheets

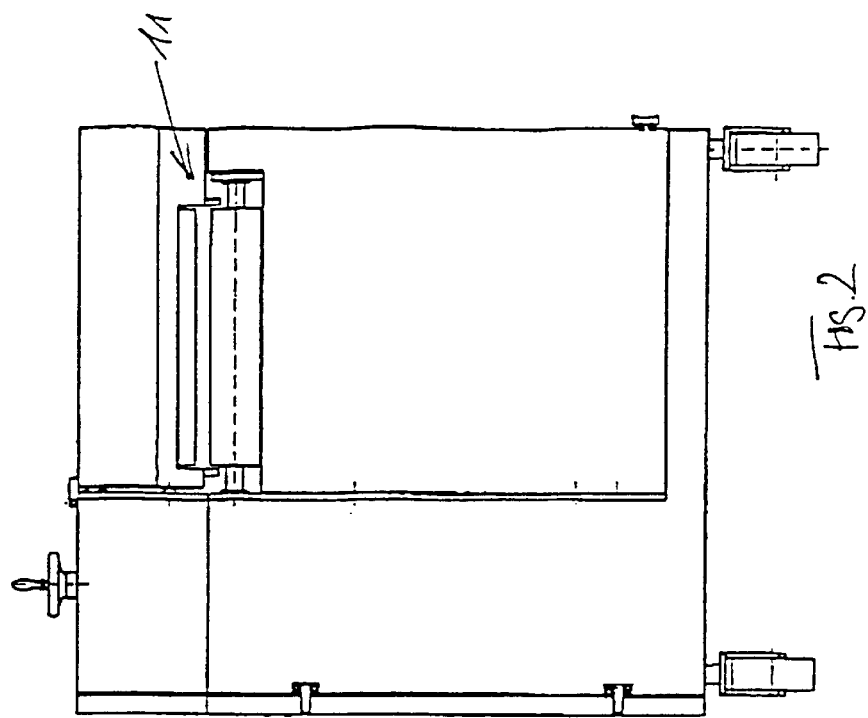
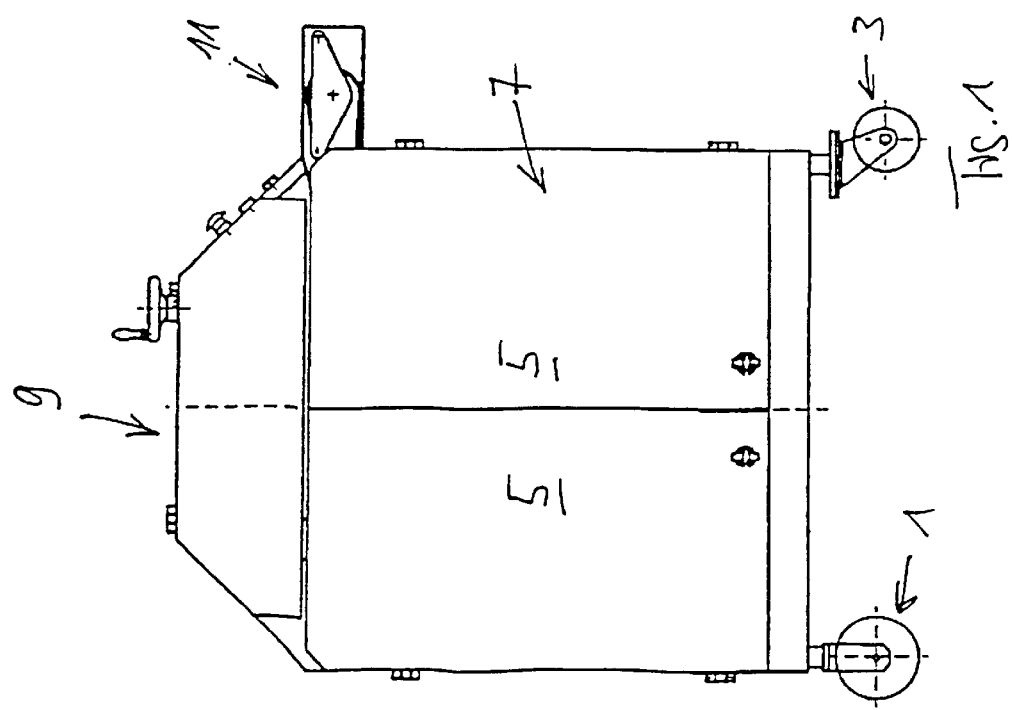

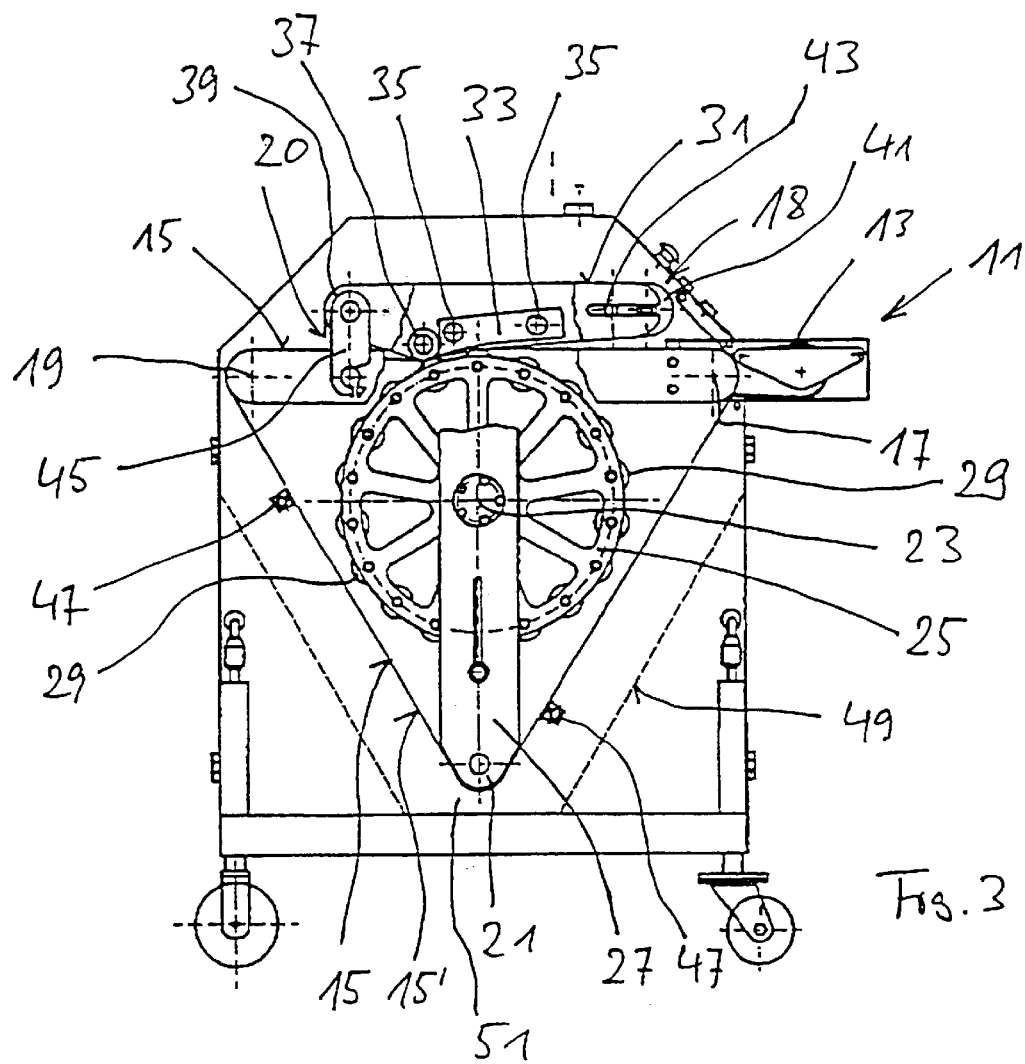
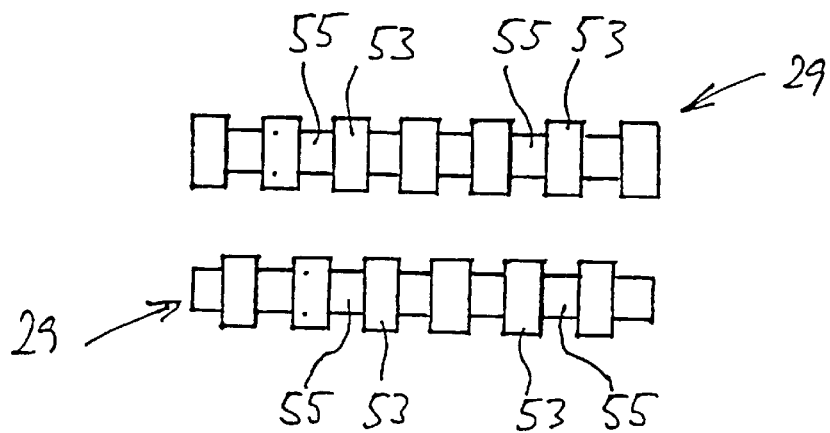

DEVICE FOR FLATTENING PIECES OF MEAT

This application is the US national phase of international application PCT/EP01/03911 filed Apr. 5, 2001, which designated the US.

The invention relates to a device for flattening pieces of meat according to the preamble of claim 1.

It has always been known for pieces of meat to be flattened, in particular if they are to be processed in schnitzel form. On the one hand, this flattening operation is carried out with the aim of increasing the size of the pieces of meat while simultaneously reducing the thickness.

In addition, the flattening operation causes the meat to become tender. Connective tissue is known to make meat tough. The flattening operation causes the fibrils to be rearranged and the connective tissue between the fibrils to tear.

Devices which, in a manner comparable to the conventional operation of beating the meat, are intended to make it possible for the pieces of meat to be flattened, have already been disclosed. Such known devices comprise two conveying belts. These conveying belts are arranged one above the other by way of a gap which decreases more and more from an inlet side to a discharge side. As a result, the pieces of meat are pressed increasingly flat during the transporting operation.

In this case, the conveying-belt surfaces are supported either by plates or by rollers or by both. There are also flattening devices which additionally comprise vibrators.

There are also processes which press two plates against one another only under high pressure.

The conveying belts have to have comparatively pronounced surface structures since, otherwise, they cannot carry along the meat in the conveying direction into the increasingly tapering gap between the two conveying belts, that is to say in the tapering direction, and otherwise the meat would slide away counter to the conveying direction with increasing tapering of the conveying belts.

It proves to be disadvantageous for such installations, however, that, although the meat is clamped between the two conveying belts, e.g. is pressed with the effect of reducing the thickness, it is not easy thus to make it possible to increase the surface area of the piece of meat. This is because the meat is pressed in firmly between the two belts, and builds up pronounced friction in relation to the belts, so as thus to counteract an increase in the surface area of the piece of meat.

In addition, the belt structure, as has been explained above, is necessarily usually fairly coarse. Fine belts do not ensure flattening success with pronounced deformation. In addition, the necessary overall length of such machines is comparatively large. Finally, the transporting speed is also comparatively low.

The object of the present invention is thus, based on the prior art explained, to provide an improved device for flattening foodstuffs, in particular slices of meat, which makes it possible to realize an optimum increase in size of the piece of meat while simultaneously reducing the thickness.

The object is achieved according to the invention by the features specified in claim 1. Advantageous configurations of the invention are specified in the subclaims.

The device according to the invention makes it possible for tender ready-to-cook schnitzels to be produced, for example, reliably and quickly. According to the invention, it is possible here to realize, in continuous operation, a high degree of meat tenderness and a permanent increase in size of the piece of meat, with the thickness simultaneously being evened out, with a low level of additional operational outlay. Since the fibrils are not severed, the juice remains in the meat. As a result the process according to the invention has considerable advantages in relation to known processes for tenderizing by cutting into the portions of the meat (making them into steaks).

Finally, it is possible to dispense with belts with pronounced structures, this ensuring that the surface of the meat is not adversely affected by pronounced corrugation.

This is ensured according to the invention by a rotating drum which has circumferentially offset rolling-out rollers or a multiplicity of beating rollers, which are preferably arranged parallel to the axis of rotation of the rotating drum.

It is possible here for the meat to be guided relatively loosely between two belts up to a flattening location in the region of the rotating drum. A pressure-relief phase, in which the meat can expand, takes place between each of the pressing phases.

An increase in surface area is also aided and assisted, according to the invention, in particular in that in each case two beating or rolling-out rollers which are arranged adjacent to one another in the circumferential direction on the beating drum are provided with coordinated surface structures. This is because the eating rollers have a circumferential groove formation, the raised ring crosspieces and the ring grooves located therebetween, which are arranged successively in the axial direction, in one beating roller being offset from those of the adjacent beating roller. In other words, the raised ring crosspieces on one beating roller, in respect of the axial length of the latter, are located precisely at those locations at which the smaller-diameter ring grooves are formed on the adjacent beating roller and vice versa. As a result of the raised locations of the beating rollers thus alternating with the lower-level locations thereof, the meat can optimally increase in size both in the longitudinal direction and in the transverse direction and thus become thinner as uniformly as possible.

A further improvement is achieved in that, at the inlet to the flattening location, it is possible to reduce the inlet angle between a counter-plate and the radius of curvature of the beating drum in that the counter-plate, rather than running rectilinearly with the tangential end oriented toward the radius of the beating drum, is formed with its abutment surface oriented concavely in relation to the beating drum. This results in kinematics comparable to a planar, i.e. rectilinear and thus tangential abutment plate, although the latter, in order to achieve the same conditions, would require the beating drum to have a considerably larger diameter than the present invention, as a result of which the overall size of the installation would be very much greater.

The invention is explained in more detail hereinbelow with reference to an exemplary embodiment. In the figures, specifically:

FIG. 1 shows a front view of the continuous-operation flattening device according to the invention with the front doors closed;

FIG. 2 shows a side view along the arrow A illustrated in FIG. 1;

FIG. 3 shows an illustration corresponding to FIG. 1 with the front doors open and the top cover open; and FIG. 4 shows a schematic side view of two adjacent beating rollers with the different positions of the grooved formations.

The flattening device for permanently increasing the size of pieces of meat while simultaneously reducing the thickness, which will be explained with reference to FIGS. 1 to 4, is equipped, as a mobile unit, with fixed and castor wheels 1, 3.

The flattening devices comprises a housing 7, which in the exemplary embodiment shown is provided with two front doors 5, and a housing covering 9 located at the top.

As can be seen in particular in the schematic illustration according to FIG. 3, this giving an interior view, the flattening device comprises an inlet 11 with a separate circulating inlet belt 13.

Provided as the central conveying arrangement is a conveying belt 15 which is guided in circulation from a deflecting location 17 (which is formed by a circulating roller which is not represented specifically in the drawing), in an at least more or less horizontal transporting direction, to a discharge-side deflecting location 19 and, from there, to a deflecting location 21 located at the bottom and, via the latter, back to the inlet-side deflecting location 17. This results, as seen in the side view according to FIG. 3, in a conveying section of the conveying belt 15 which may be referred to roughly as being triangular.

Arranged within this conveying belt 15 is a beating drum 25 which rotates about an axis of rotation 23 and is arranged via side members 27.

Mounted in a circumferentially offset manner on the beating drum 25 are a multiplicity of beating rollers (29 which are also referred in some cases as rolling-out rollers 29), which have a diameter which is smaller than that of the beating drum 25, i.e. a diameter which are less than 25%, in particular less than 20% or even about 10%, of the diameter of the beating drum 25, or even less.

Interacting with the conveying belt 15 is a counter-belt 31, which is arranged so as to circulate between the inlet side 18 and the release side 20, above the conveying belt 15. In this case, the counter-belt 31 runs along a counter-plate 33, which is located on top and is a slightly concave configuration in relation to the beating drum 25. Via said counter-plate, the counter-belt 31 is guided up tangentially to the beating drum 25 [lacuna] a concave path in relation to the beating drum 25. The counter-plate here is retained and adjusted via two shafts 35.

Arranged downstream of the counter-plate 33, as seen in the conveying direction, is a counter-roller 37, which interacts with the beating rollers 29.

In the region of the counter-roller 37, the counter-belt has reached the lowermost point in relation to the beating drum 25 and, from there, slopes up again slightly to an outlet-side deflecting roller 39, from where it is guided approximately horizontally to an inlet-side deflection roller 41 in order, from there, to run in the direction of the counter-plate 33 again. In the exemplary embodiment shown here, the inlet-side deflection roller 41 can be displaced axially by means of a corresponding tensioning and guiding arrangement 43 such that the counter-belt 31 can always be tensioned appropriately.

The counter-belt is height-adjustable. The flattening thickness is set as a result. It is also conceivable, however, for the drum to be adjusted.

In order for the counter-belt 31 to be easily removed, changed and, if appropriate, also cleaned to better effect, one end side of the outlet-side deflection roller 39 is supported and secured by a pivotable arresting lever 45.

As, finally, can also be seen, it is also the case, in the exemplary embodiment shown, that strippers 47 are arranged in an offset manner at two locations in the direction of circulation of the conveying belt 15, said strippers each interacting with the top side 15' of the conveying belt 15, on which the pieces of meat are positioned between the inlet side and discharge side. It is thus possible for residues of meat to drop freely downward and be passed on to a bottom collecting location 51 by an intercepting arrangement 49, which is likewise approximately V-shaped in side view.

The functioning of the flattening device will be discussed hereinbelow.

The individual pieces of meat which are to be flattened are introduced onto the inlet belt 13 at a distance apart from one another and are advanced in the direction of the conveying belt 15 via the inlet belt 13.

At the transfer location in the region of the inlet-side deflecting location 17, the piece of meat which is to be flattened is transferred to the conveying belt 15.

During continued forward movement, the counter-belt 31 is positioned on the corresponding piece of meat from the top side, with the result that the piece of meat is then moved forward between the top side of the conveying belt 15 and the underside of the counter-belt 31 located above.

In the region of the counter-plate 33, the piece of meat which is to be flattened is then easily moved forward to an increasingly pronounced extent in the direction of the circumference of the beating drum 25. During this advancement movement, the piece of meat is made to interact with the multiplicity of beating rollers 29, which, during continuing rotation of the beating drum 25, act from the underside on the under-side of the conveying belt 15 and, via the latter, on the piece of meat which is to be flattened, the piece of meat being prevented from yielding upward as a result of the counter-plate 33 located in this region. The rotary movement of the beating drum 25 should take place here with a velocity in the advancement movement of the conveying belt or in the opposite direction, counter to the advancement movement of the conveying belt, but preferably with a sufficiently high rotational velocity for the beating rollers 29 not to advance at the same velocity as the advancement movement of the conveying belt 15. In other words, a plurality of beating rollers 29 thus pass over each piece of meat, as a result of which the meat is flattened to an increasingly pronounced extent, and thus reduced in thickness, by the ever smaller gap between the beating rollers and counter-plate 33 and/or the beating rollers and the counter-roller 37 seated at the outlet of the counter-plate 33.

The desired increase in surface area of the piece of meat here, however, is ensured in that pressing phases and pressure-relief phases always alternate during the flattening operation. This is because the beating rollers 29 produce the short pressing phases as they move across the piece of meat, and, until the next beating roller takes effect, the distance between two beating rollers 29 results in the desired pressure-relief phase, in which the forces acting on the piece of meat then help the piece of meat to be increased in surface area not just in the advancement direction of the conveying belt, but also transversely thereto.

This desired increase in surface area is also assisted and enhanced in that the beating rollers 29 are provided with a certain surface structure, as can be seen from FIG. 4.

This is because the beating rollers 29 have a multiplicity of circumferentially running ring crosspieces 53, a lower-level ring groove 55 being formed in each case between two ring crosspieces 53 seated adjacent to one another in the axial direction of a beating roller 29. An adjacent beating roller 29, then, is equipped such that the ring crosspieces 53 formed there, as seen in the direction of rotation and circulation of the beating drum 25, each end up at the locations at which the ring grooves of an adjacent beating roller 29 are located and vice versa.

This construction, ultimately, results in a beating action of linear, punctiform or surface-area parts of the beating rollers 29 on the conveying belt and, via the latter, on the meat, this making it possible for deformation and pressure relief to be alternated quickly. Since, as has been mentioned, the rolling-out rollers 29 are produced alternately with smaller and larger diameters, this also results, offset in the axial direction of the respective roller 29, in a constant alternation between pressing locations and non-loaded locations.

By virtue of possibly higher rotational speeds, it is additionally possible to achieve a pronounced level of deformation energy even in the case of high transporting speeds.

The concavely curved counter-plate 33 explained allows the pieces of meat which are to be flattened to be fed virtually tangentially, as desired, in relation to the circumference of the beating drum 25. Without this concave configuration, it would otherwise be necessary, for feeding the pieces of meat tangentially to the flattening location, to use a beating drum with a very much larger drum diameter than the exemplary embodiment explained.

The exemplary embodiment shown has been explained for the case where the beating rollers, which are also referred to in some cases as rolling-out rollers 29, are retained in a rotatable manner on a beating drum 25. Structures other than the beating drum may also be used, however, as the retaining and guiding bodies. It is conceivable for the abovementioned beating rollers or rolling-out rollers 29 to be retained such that they can be rotated preferably about their own axis, for example, by means of some other kind of circulating guiding arrangement, for example by the axially outwardly projecting axle journals of the beating rollers 29 being mounted in a circulating carriage guide. However, the beating rollers 29 otherwise act and function in the same way. Further modifications are also possible in this respect.

The exemplary embodiment has been explained for the case where the beating rollers 29 are advanced in circulation, on the underside of the conveying belt in the flattening zone, in or counter to the conveying-belt direction. It would also be possible, however, for the beating drum to be oriented differently, i.e. at an angle to the conveying belt. It would even be possible for the axis of rotation of the beating drum, that is to say the beating rollers, to be oriented in the conveying-belt direction, and thus for the beating rollers to interact, on the underside of the conveying belt in the flattening zone, with the pieces of meat moving across the same, in the direction transverse to the conveying direction of the conveying belt.

What is claimed is:

1. A flattening device for flattening pieces of meat so that the surface area of the pieces of meat is increased while the thickness is simultaneously reduced, characterized by the following features there is provided a conveying arrangement (15, 31), via which the pieces of meat which have to be flattened can be sent to a flattening zone, beating rollers or rolling-out rollers (29) which can be displaced relative to the piece of meat are provided in the region of the flattening zone, and the distance between the beating rollers or rolling-out rollers (29), which can be moved across the piece of meat which is to be flattened, and a counterpressure arrangement or surface (33) can preferably be reduced during the operation of flattening the piece of meat.

2. The flattening device as claimed in claim 1, characterized in that there are provided a plurality of beating rollers or rolling-out rollers (29) which can be displaced, along a guide body or a guide path in the flattening zone, across the piece of meat which is to be flattened.

3. The flattening device as claimed in claim 1, characterized in that the beating rollers are anchored so as to be offset in the circumferential direction on a beating drum rotating about an axis of rotation.

4. The flattening device as claimed in claim 1, characterized in that the beating rollers are suspended such that they can be rotated about their axis.

5. The flattening device as claimed in claim 1, characterized in that the beating rollers are not driven.

6. The flattening device as claimed in claim 1, characterized in that, in the flattening zone, the beating rollers can be rolled across the underside of the conveying belt along which the pieces of meat which are to be flattened can be moved.

7. The flattening device as claimed in claim 1, characterized in that the conveying arrangement for a piece of meat which is to be flattened comprises a conveying belt and a counter-belt which is spaced apart therefrom, the piece of meat which is to be flattened being advanced in a sandwich-like manner between said belt.

8. The flattening device as claimed in claim 1, characterized in that the conveying belt is advanced in a circulating manner on a circulatory path from an inlet side, via a discharge side, to an inlet side, the conveying arrangement for the advancing beating rollers being arranged within the circulating path.

9. The flattening device as claimed in claim 1, characterized in that the counter-belt, which interacts with the conveying belt, interacts, in the region of the flattening zone, with a counter-plate which is arranged on the rear side, opposite to the conveying belt.

10. The flattening device as claimed in claim 9, characterized in that the counter-plate (33) is of slightly concave configuration in relation to the beating rollers (29).

11. The flattening device as claimed in claim 3, characterized in that the inlet angle between the conveying belt and counter-belt is predetermined by the difference of the radii of curvature between the concave configuration of the counter-plate and the radius of the beating drum.

12. The flattening device as claimed in claim 1, characterized in that respectively adjacent beating rollers are designed with different surface structures.

13. The flattening device as claimed in claim 1, characterized in that the beating rollers are provided with circumferential crosspieces, smaller-diameter circumferential grooves being arranged in each case between two adjacent circumferential crosspieces.

14. The flattening device as claimed in claim 12, characterized in that the circumferential crosspieces and the circumferential grooves on two adjacent beating rollers are offset in relation to one another such that in each case one circumferential crosspiece on one beating roller ends up located in the region of the circumferential groove on the adjacent beating roller and vice versa.

15. The flattening device as claimed in claim 3, characterized in that the beating drum is provided with a height-adjusting arrangement.

16. The flattening device as claimed in claim 1, characterized in that at least one, but preferably more than one, stripper is provided, the latter interacting with the top side of the conveying belt.

17. The flattening device as claimed in claim 3, characterized in that the axis of rotation of the beating drum is oriented transversely to the conveying direction of the conveying belt.

18. The flattening device as claimed in claim 3, characterized in that the axis of rotation of the beating drum is oriented parallel to the transporting plane of the conveying belt.

19. The flattening device as claimed in claim 3, characterized in that the beating rollers or rolling-out rollers are arranged parallel to the plane of the conveying belt and/or of the axis of rotation of the beating drum.

20. The flattening device as claimed in claim 1, characterized in that the beating rollers, in deviation from the conveying direction of the conveying belt, move across the underside of the conveying belt, preferably transversely thereto.

21. The flattening device as claimed in claim 1, characterized in that the distance between the beating rollers or rolling-out rollers, which can be moved across the piece of meat which is to be flattened, and a counterpressure arrangement or surface can be reduced during the operation of flattening the piece of meat.

* * * * *